US012756997B2

(12) United States Patent
Aoyagi et al.

(10) Patent No.: US 12,756,997 B2
(45) Date of Patent: Oct. 6, 2026

(54) SENSOR SETTING IN ACCORDANCE WITH REQUEST FOR SENSOR INFORMATION CONCERNING SENSING AREA

(71) Applicant: RAKUTEN MOBILE, INC., Tokyo (JP)

(72) Inventors: Kenichiro Aoyagi, Tokyo (JP); Jin Kusumi, Tokyo (JP); Takuya Miyazawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 165 days.

(21) Appl. No.: 18/574,071

(22) PCT Filed: Feb. 10, 2023

(86) PCT No.: PCT/JP2023/004518
§ 371 (c)(1),
(2) Date: Dec. 26, 2023

(87) PCT Pub. No.: WO2024/166347
PCT Pub. Date: Aug. 15, 2024

(65) Prior Publication Data
US 2025/0106603 A1 Mar. 27, 2025

(51) Int. Cl.
*H04W 4/38* (2018.01)

(52) U.S. Cl.
CPC .................................... *H04W 4/38* (2018.02)

(58) Field of Classification Search
CPC ...................................................... H04W 4/38
See application file for complete search history.

(56) References Cited

U.S. PATENT DOCUMENTS 9,956,963 B2 * 5/2018 Vijaya Kumar ...... B60W 40/08
12,111,408 B2 * 10/2024 Edge ..................... G01S 5/0242
(Continued)

FOREIGN PATENT DOCUMENTS

JP 2004362267 A 12/2004
JP 2010278886 A 12/2010
(Continued)

OTHER PUBLICATIONS

"3GPP TR 22.837 V0.3.0 (Nov. 2022)", Retrieved from the Internet <URL: https://www.3gpp.org/ftp/Specs/archive/22_series/22.837/22837-030.zip>, 2022, pp. 9, 11, 12, 15-17, 24-29, 34-36, 51-55, 61-63., 24pp.
(Continued)

*Primary Examiner* — Hai V Nguyen
(74) *Attorney, Agent, or Firm* — HAUPTMAN HAM, LLP

(57) ABSTRACT

A communication control apparatus includes at least one processor that performs, by a sensing information providing sensor setter, setting a sensor, among a plurality of sensors whose sensing ranges are included in a sensing area, to provide the sensing information through a mobile communication network in response to a request for sensing information concerning the sensing area. The sensing information providing sensor setter sets the providing manner of the sensing information from the sensor in response to the request. The at least one processor: by a sensor identifiable information reducer, reducing information identifiable of the sensor in its sensing information, based on the providing manner set by the sensing information providing sensor setter, in response to the request; and by a sensing information outputter, outputting the sensing information with reduced information identifiable of the sensor by the sensor identifiable information reducer, in response to the request.

13 Claims, 7 Drawing Sheets

(56) References Cited

U.S. PATENT DOCUMENTS

| | | | | |
|---|---|---|---|---|
| 12,332,353 | B2 * | 6/2025 | Gum | G01S 17/86 |
| 12,356,295 | B2 * | 7/2025 | Leng | H04W 4/38 |
| 2013/0260783 | A1 | 10/2013 | Agrawal et al. | |
| 2014/0350893 | A1 | 11/2014 | De Antoni | |
| 2015/0241993 | A1 | 8/2015 | Gallo et al. | |
| 2015/0248275 | A1 | 9/2015 | Gallo et al. | |
| 2015/0338447 | A1 | 11/2015 | Gallo et al. | |
| 2015/0339407 | A1 | 11/2015 | Gallo et al. | |
| 2015/0339594 | A1 | 11/2015 | Gallo et al. | |
| 2015/0341979 | A1 | 11/2015 | Gallo et al. | |
| 2015/0341981 | A1 | 11/2015 | Gallo et al. | |
| 2017/0094716 | A1 | 3/2017 | Pogorelik et al. | |
| 2017/0103440 | A1 * | 4/2017 | Xing | G06Q 30/0625 |
| 2017/0111714 | A1 | 4/2017 | Gallo et al. | |
| 2017/0284839 | A1 | 10/2017 | Ojala | |
| 2018/0354647 | A1 | 12/2018 | North et al. | |
| 2019/0132709 | A1 | 5/2019 | Graefe et al. | |
| 2023/0324541 | A1 * | 10/2023 | Zorgui | G01S 7/006 455/456.1 |
| 2024/0049168 | A1 * | 2/2024 | Bao | H04W 4/023 |
| 2024/0427934 | A1 | 12/2024 | Trivedi et al. | |
| 2025/0088829 | A1 * | 3/2025 | Aoyagi | H04W 4/38 |

FOREIGN PATENT DOCUMENTS

| | | | |
|---|---|---|---|
| JP | 2014241024 | A | 12/2014 |
| JP | 2015226102 | A | 12/2015 |
| JP | 6380517 | B2 | 8/2018 |
| JP | 2018147290 | A | 9/2018 |
| JP | 2019032801 | A | 2/2019 |
| JP | 2022129091 | A | 9/2022 |
| WO | 2018142598 | A1 | 8/2018 |
| WO | 2022081624 | A1 | 4/2022 |

OTHER PUBLICATIONS

Huawei, HiSilicon, "[Change Request] Adding Accuracy Checking Capability to NWDAF Architecture", 3GPP TSG-WG SA2 Meeting #154 S2-2210348, [online], Nov. 4, 2022, pp. 1-15, [retrieved on Apr. 10, 2023], Retrieved from the Internet <URL: https://www.3gpp.org/ftp/tsg_sa/WG2_Arch/TSGS2_154_Toulouse_2022-11/Docs/S2-2210348.zip>, 6.1.3 Contents of Analytics Exposure [pp. 7-10], 6.1X.3 Procedures for Analytics Accuracy Information Request [pp. 12-13], 16pp.

Xiaomi, "Sensing Charging consideration", 3GPP TSG-SA WG1 Meeting #100 S1-223502, [online], Nov. 21, 2022, p. 1, [retrieved on Apr. 10, 2023], retrieved from the Internet <URL: https://www.3gpp.org/ftp/tsg_sa/WG1_Serv/TSGS1_100_Toulouse/Docs/S1-223502.zip>, 6.x.2 Potential New Requirements [p. 1], 2pp.

Xiaomi, "Use case on privacy protection of sensing target", 3GPP TSG-SA WG1 Meeting #100 S1-223351, [online], Nov. 21, 2022, pp. 1-2, [retrieved on Apr. 10, 2023], retrieved from the Internet <URL: https://www.3gpp.org/ftp/tsg_sa/WG1_Serv/TSGS1_100_Toulouse/Docs/S1-223351.zip>, 5.x.6 Potential New Requirements needed to support the use case [p. 2], 19pp.

Extended European Search Report in EP Application No. 23921175.8, dated Oct. 23, 2025, 9pp.

Extended European Search Report in EP Application No. 23921176.6, dated Oct. 23, 2025, 8pp.

* cited by examiner

FIG.4

| Sensing Area ID | Cell ID | Cell Type | Cell Location | Sensed Information | Sensing Accuracy | Provision Manner of Sensed Information | Use Case (Beneficiary of Info.) |
|---|---|---|---|---|---|---|---|
| AAA | Cell#1 | Satellite BS | Low Earth Orbit | Com. quality etc. | xx% (max.) | Anonymous/Onymous | Public/Commercial/OAM |
| | Cell#2 | Macrocell BS | Outdoor | Com. quality etc. | xx% (max.) | Anonymous/Onymous | Public/Commercial/OAM |
| | Cell#3 | Femtocell FC | Outdoor/Indoor | Connected users etc. | xx% (max.) | Anonymous/Onymous | Public/Commercial/OAM |
| | Cell#4 | Aircraft FS | Troposphere | Com. quality etc. | xx% (max.) | Anonymous/Onymous | Public/Commercial/OAM |
| | Cell#5 | Relay Station RS | Outdoor/Indoor | Connected users etc. | xx% (max.) | Anonymous/Onymous | Public/Commercial/OAM |
| | Cell#6 | IAB Node IAB | Outdoor/Indoor | Connected users etc. | xx% (max.) | Anonymous/Onymous | Public/Commercial/OAM |
| | Cell#7 | Sensor Unit (43) | Outdoor/Indoor | Various information | xx% (max.) | Anonymous/Onymous | Public/Commercial/OAM |
| | Cell#8 | UE (2) | Outdoor/Indoor | Various information | xx% (max.) | Anonymous/Onymous | Public/Commercial/OAM |
| | ... | ... | ... | ... | ... | ... | ... |
| BBB | Cell#1 | Satellite BS | Low Earth Orbit | Com. quality etc. | xx% (max.) | Onymous | Emergency Agency |
| | Cell#2 | Macrocell BS | Street | Com. quality etc. | xx% (max.) | Anonymous | Service Provider |
| | Cell#5 | Relay Station RS | Tunnel | Connected users etc. | xx% (max.) | Onymous | Operator |
| | ... | ... | ... | ... | ... | ... | ... |
| CCC | Cell#3 | Femtocell FC | Indoor | Connected users etc. | xx% (max.) | Anonymous | Individual/Private |
| | Cell#7 | Sensor Unit (43) | Inside Building | Various information | xx% (max.) | Anonymous | Maintenance/Security |
| | ... | ... | ... | ... | ... | ... | ... |

FIG.5

| Scenario | Sensing service area | Confidence level [%] | Positioning accuracy by sensing (for a target confidence level) | | Velocity estimation accuracy by sensing (for a target confidence level) | | Sensing resolution | | Max sensing service latency [ms] | Refreshing rate [s] | Missed detection [%] | False alarm [%] |
|---|---|---|---|---|---|---|---|---|---|---|---|---|
| | | | Horizontal [m] | Vertical [m] | Horizontal [m/s] | Vertical [m/s] | Range resolution [m] | Velocity resolution (horizontal / vertical) [m/s x m/s] | | | | |
| Crowd Detection | Indoor/ Outdoor | [95%] | [≤1m] | N/A | [<1m/s] | N/A | [1m] | [1m/s] | [≤5000 ms] | [≤1s] | [≤5%] | [≤5%] |
| | | | | | | | | | | | | |

FIG.6

| Sensing Area ID | Use Case | Beneficiary of Info. | Sensor to be used | Information to be provided | Anonymizing sensitive information | Detail Level (Accuracy) |
|---|---|---|---|---|---|---|
| AAA | Emergency Report (Public) | Emergency Agency (Public Agency) | Almost every sensor in the sensing area | Any information indicating the emergency | Not necessarily | Almost maximum |
| | OAM | Operator | Almost every sensor in the sensing area | Any information indicating communication quality etc. | Not necessarily (as long as properly handled within the network) | Almost maximum |
| | Information Service (Commercial) | Service Provider (Premium User) | Specified in service agreement (many) | Specified in service agreement (many) | Necessary at fair level (as long as properly handled under the service agreement) | Specified in service agreement (high) |
| | Information Service (Commercial) | Service Provider (Standard User) | Specified in service agreement (few) | Specified in service agreement (few) | Necessary at high level | Specified in service agreement (low) |
| | Information Service (Private) | Individual (Paying User) | Specified in service agreement (many) | Specified in service agreement (many) | Necessary at fair level (as long as properly handled under the service agreement) | Specified in service agreement (high) |
| | Information Service (Private) | Individual (Non-paying User) | Specified in service agreement (few) | Specified in service agreement (few) | Necessary at highest level | Specified in service agreement (low) |
| | ... | ... | ... | ... | ... | ... |
| BBB | ... | ... | ... | ... | ... | ... |
| ... | ... | ... | ... | ... | ... | ... |

SENSOR SETTING IN ACCORDANCE WITH REQUEST FOR SENSOR INFORMATION CONCERNING SENSING AREA

RELATED APPLICATIONS

The present application is a National Phase of International Application Number PCT/JP2023/004518, filed Feb. 10, 2023.

BACKGROUND OF THE INVENTION

1. Field of the Invention

The present disclosure relates to sensor setting in accordance with request for sensor information concerning sensing area.

2. Description of the Related Art

The number, types, and applications of wireless communication devices (hereinafter also collectively referred to as communication devices), represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Patent Literature 1: JP-A-2010-278886

SUMMARY OF THE INVENTION

In new mobile communication networks such as 5G, in addition to terrestrial base stations (e.g., eNB) fixedly installed on the ground that provide relatively large communication cells, which have been the mainstream in conventional mobile communication networks such as 4G, a wide variety of communication stations are envisioned for use, including: extremely small base stations that provide extremely small (e.g., a few meters to ten meters in radius) femtocells; flying base stations mounted on flying satellites or aircrafts; relay stations that communicate with existing base stations to expand existing communication cells; and integrated access and backhaul (IAB) nodes described below. Such communication stations can be equipped with various sensor functions, but concrete methods to improve the utilization efficiency of a wide variety of sensing information acquired from them are not sufficiently defined.

The present disclosure was made in consideration of such situation, and its purpose is to provide a communication control apparatus and the like that can improve the utilization efficiency of a sensor group in a mobile communication network.

In order to solve the above issue, a communication control apparatus in a certain aspect of the present disclosure includes at least one processor that performs, by a sensing information providing sensor setter, setting a sensor, among a plurality of sensors whose sensing ranges are included in a sensing area, to provide the sensing information through a mobile communication network in response to a request for sensing information concerning the sensing area.

According to such aspect, among a plurality of sensors (e.g., provided in a plurality of communication stations as described above) capable of mobile communication, the sensor to actually provide the sensing information is set in accordance with the request for sensing information concerning the sensing area. Based on such a setting, the necessary sensing information is quickly provided from the appropriate sensor in accordance with the actual request, thereby improving the utilization efficiency of the sensor group in the mobile communication network.

Another aspect of the present disclosure is a communication control method. The communication control method performs, setting a sensor, among a plurality of sensors whose sensing ranges are included in a sensing area, to provide the sensing information through a mobile communication network in response to a request for sensing information concerning the sensing area.

Further another aspect of the present disclosure is a computer-readable medium. The medium stores a communication control program causing a computer to perform, setting a sensor, among a plurality of sensors whose sensing ranges are included in a sensing area, to provide the sensing information through a mobile communication network in response to a request for sensing information concerning the sensing area.

In addition, any combination of the above components, and any conversion of the expression of the present disclosure among methods, devices, systems, recording media, computer programs and the like are also encompassed within the present disclosure.

According to the present disclosure, the utilization efficiency of a sensor group in a mobile communication network can be improved.

BRIEF DESCRIPTION OF THE DRAWINGS

FIG. 4 is a table showing examples of sensing capabilities of a large number of sensors recognized by a mobile communication network.

FIG. 5 shows an example of a table that defines sensing accuracy.

FIG. 6 is a table showing examples of setting information by the sensing information providing sensor setter.

DETAILED DESCRIPTION OF THE INVENTION

Figure 1:
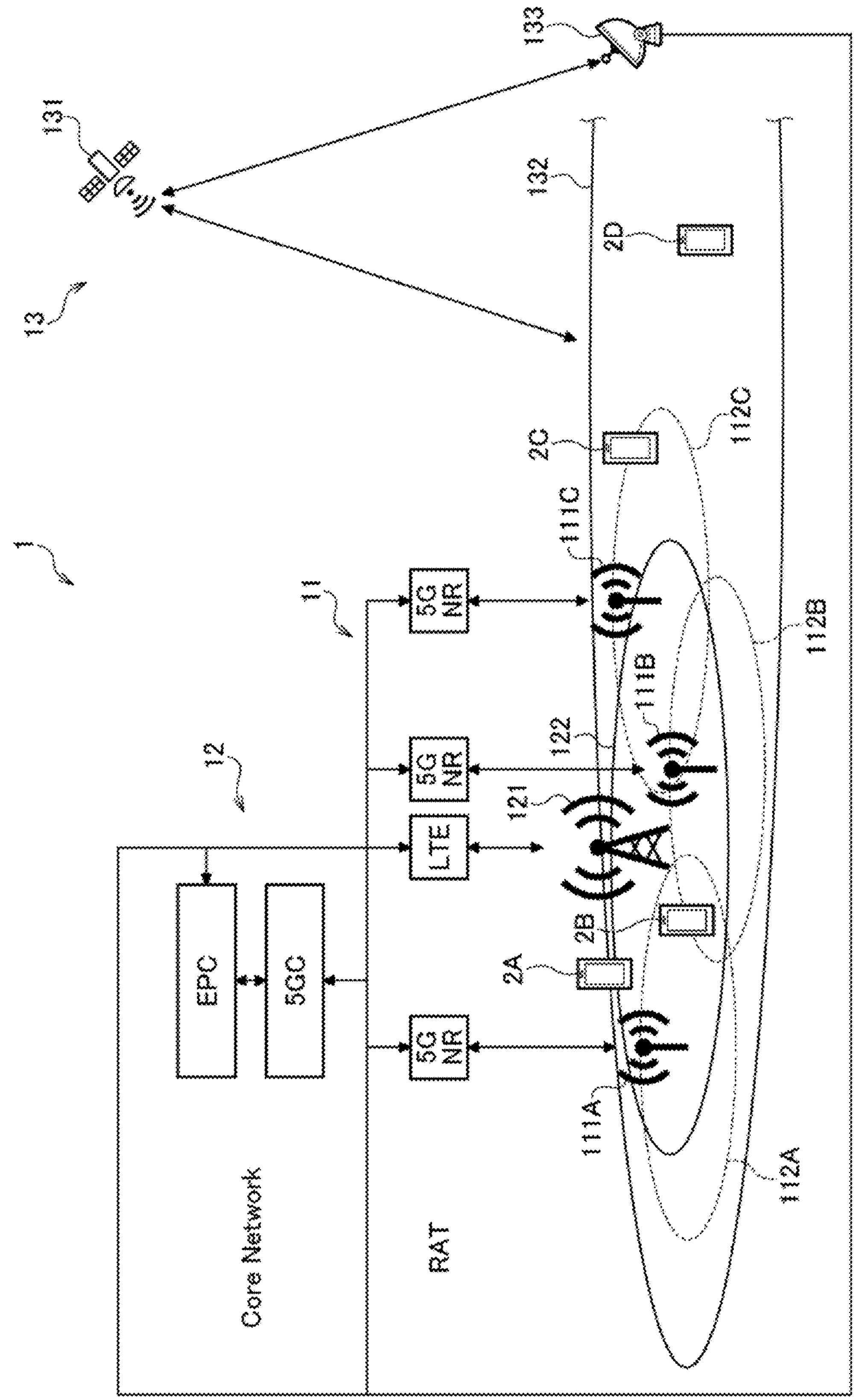
FIG. 1 schematically shows the overview of a wireless communication system to which the communication control apparatus is applied.

FIG. 1 schematically shows an overview of a wireless communication system 1 to which the communication control apparatus according to an embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is responsible for satellite communication via communication satellite 131. Although not shown in the figure, the wireless communication system 1 may include wireless communication networks of a generation prior to 4G, a generation later than 5G (e.g., 6G), or any wireless communication networks that are not associated with generations, such as Wi-Fi (registered trademark).

The 5G wireless communication system 11 may include a plurality of 5G base stations 111A, 111B, and 111C (hereinafter also collectively referred to as 5G base station 111) installed on the ground capable of communicating by 5G NR with communication devices 2A, 2B, 2C, and 2D (hereinafter also collectively referred to as communication device (s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter also collectively referred to as 5G cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication device 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1). The plurality of 4G base stations 121 are installed on the ground and can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication device 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and the 4G base station 121 as terrestrial base stations that constitute the terrestrial network (TN). In this way, the gateway 133 connects the non-terrestrial network (NTN), which includes communication satellites 131 as a non-terrestrial base station or a satellite base station, and the terrestrial network TN, which includes terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In this way, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of about 500 km to 700 km above the ground as a flying non-terrestrial base station. However, a communication satellite flying in geostationary orbit or other higher orbit in outer space, or an unmanned or manned aircraft or a drone flying in stratosphere or other lower (e.g., about 20 km above the ground) atmosphere may be used as a non-terrestrial base station in addition to or instead of the communication satellite 131.

Figure 2:
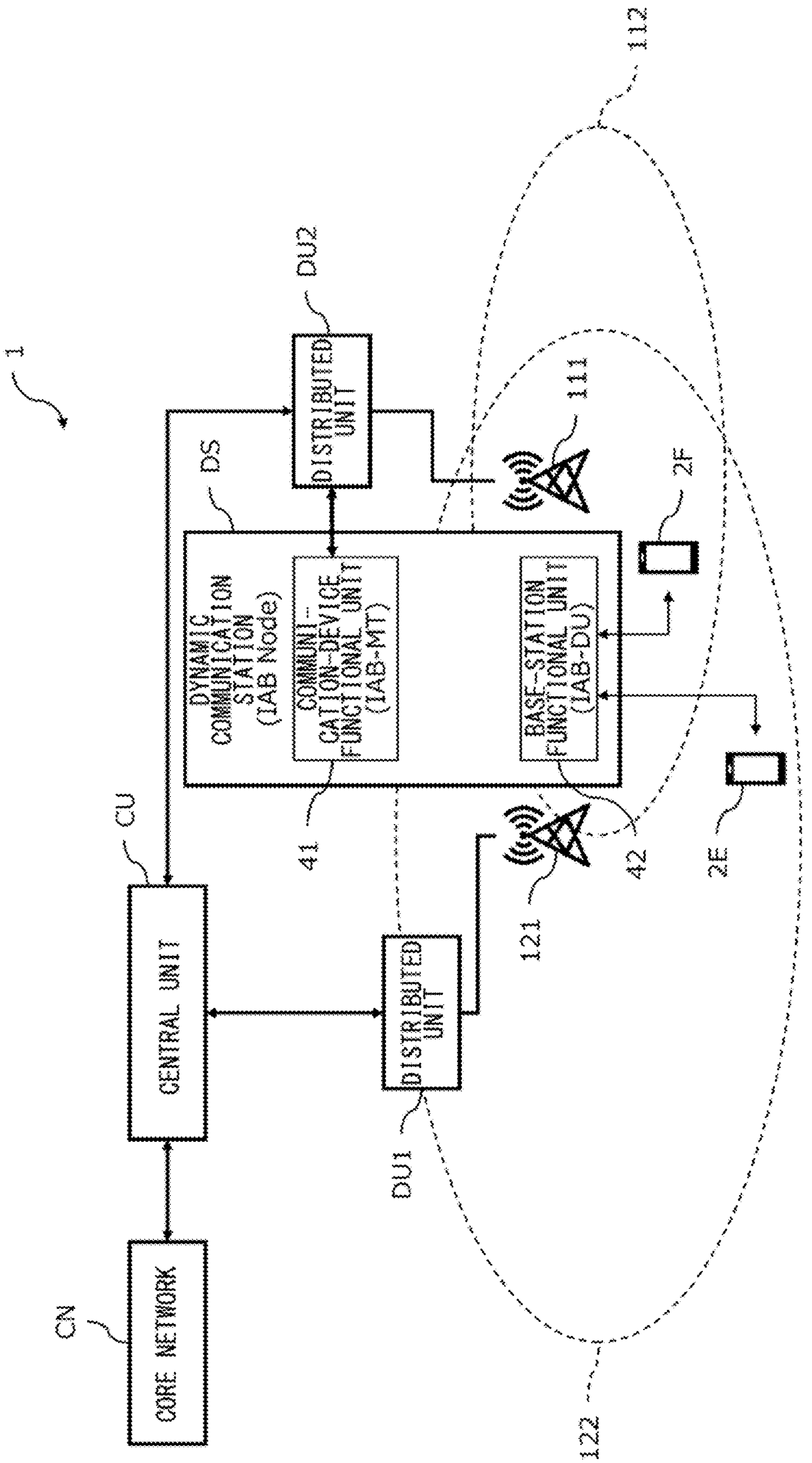
FIG. 2 schematically shows the general configuration of the wireless communication system to which the communication control apparatus can be applied.

FIG. 2 schematically shows the general configuration of the wireless communication system 1 to which the communication control apparatus according to an embodiment of the present disclosure can be applied. As shown also in FIG. 1, the wireless communication system 1 is usually constructed by the terrestrial communication cells 112, 122 (hereinafter also referred to as fixed communication cells) provided by the terrestrial base stations 111, 121 stationarily installed on the ground (hereinafter also referred to as fixed base stations). However, mobile communication cannot be performed outside fixed communication cells, and the quality of mobile communications might be low depending on time and/or place even within fixed communication cells. Although the wireless communication system 1 can also include the satellite communication system 13 that uses the communication satellite 131 as a non-terrestrial base station or moving base station, it is impractical to supplement the terrestrial network of terrestrial base stations 111, 121 solely by the communication satellites 131.

To solve such an issue, it is preferable to introduce a dynamic communication station DS to supplement the fixed communication cell 112, 122 provided by the fixed base station 111, 121, as schematically shown in FIG. 2. A dynamic communication station DS is, for example, a communication station capable of providing a dynamic communication cell that can vary in space and/or time. For example, a moving communication station is an example of a dynamic communication station DS that provides a spatially varying (i.e., moving) dynamic communication cell. Besides, a communication station that can switch between an active state that provides a dynamic communication cell and an inactive state that does not provide a dynamic communication cell is an example of a dynamic communication station DS that provides a dynamic communication cell that varies in time (i.e., is switched on and off).

It should be noted that a dynamic communication station DS may be, for example, a communication station whose operating time is limited to a specific time period, or it may be an on-demand communication station that can be adaptively switched between an inactive state and an active state in accordance with the communication demand of a communication device and the like. Besides, examples of a dynamic communication station DS include a moving base station such as the communication satellite 131 that itself functions as a base station (alternatively, it may be a fixed base station that can switch between an active state and an inactive state), and something like a repeater that communicates with an existing fixed base station 111, 121 to expand an existing fixed communication cell 112, 122 (hereinafter also referred to as a relay station). The dynamic communication station DS in the example in FIG. 2 is an IAB (Integrated Access and Backhaul) node.

IAB is a technology specified in 5G to expand a communication cell of a parent node, utilizing wireless backhaul between a base station that serves as an IAB donor (parent node) and an IAB node (child node) and/or between parent and child IAB nodes (where an IAB node closer to the IAB donor is the parent node, and an IAB node far from the IAB donor is the child node). Here, "expansion of a communication cell" includes not only expanding the area covered by an existing communication cell, but also improving the communication quality of at least part of an existing communication cell. Furthermore, "expansion of the area covered by a communication cell" includes not only expanding the area in the horizontal plane of an existing communication cell, but also expanding an existing communication cell vertically, e.g., underground or to the upper and/or lower floors of a building.

In FIG. 2, the dynamic communication station DS as the IAB node includes a communication-device functional unit 41 that functions as a communication device for a parent node (a parent base station) including the fixed base station 111, 121 and a base-station functional unit 42 that functions as a child base station for a communication device UE and provides the dynamic communication cell. In 5G, the communication-device functional unit 41 is specified as a MT (Mobile Termination) or IAB-MT, and the base-station functional unit 42 is specified as a DU (Distributed Unit) or IAB-DU. It should be noted that, in other wireless communication systems including generations after 5G, functions similar to IAB, MT, DU, CU (Central Unit described below) may be provided under different names, but such similar functions may be utilized as IAB, MT, DU, CU in the present embodiment.

Two fixed base stations 111 and 121 are illustrated in FIG. 2. The first fixed base station 121 as a 4G base station provides the first fixed communication cell 122 as a 4G cell, and the second fixed base station 111 as a 5G base station provides the second fixed communication cell 112 as a 5G cell. In the example in FIG. 2, the baseband function of each fixed base station 111 and 121 is divided into a central unit (CU) on the core network CN side and a distributed unit (DU) on the communication device UE side. The first distributed unit DU1 of the first fixed base station 121 is provided near the radio equipment such as an antenna of the first fixed base station 121, typically in the same base station facility as the radio equipment. The second distributed unit DU2 of the second fixed base station 111 is provided near the radio equipment such as an antenna of the second fixed base station 111, typically in the same base station facility as the radio equipment. Although the central unit CU in the example shown in the figure is shared by the first fixed base station 121 (the first distributed unit DU1) and the second fixed base station 111 (the second distributed unit DU2), separate central units may be provided for each of the fixed base stations 111 and 121. The central unit CU is connected to the core network CN. The connection between the radio equipment such as an antenna in each of the fixed base stations 111, 121 and each of the distributed units DU1, DU2, the connection between each of the distributed units DU1, DU2 and the central unit CU, and the connection between the central unit CU and the core network CN, are typically wired by conductors and/or optical fibers and the like, although some or all of those connections may be wireless.

The communication-device functional unit 41 (IAB-MT) of the dynamic communication station DS, depending on the position of the dynamic communication station DS, can connect wirelessly with the distributed unit DU of either fixed base station 111, 121. In the example in FIG. 2, the communication-device functional unit 41 is connected wirelessly to the second distributed unit DU2 of the second fixed base station 111. In this case, the dynamic communication station DS functions as a child node for the second fixed base station 111 as a parent node (a parent base station) or an IAB donor, and expands the second fixed communication cell 112 by the second fixed base station 111 as a parent node. Then, the base-station functional unit 42 (IAB-DU) of the dynamic communication station DS provides a dynamic communication cell (not shown) or a moving communication cell as expanded communication cell of the second fixed communication cell 112 to the communication device UE. In the example in FIG. 2, two communication devices 2E and 2F connected to the base-station functional unit 42 of the dynamic communication station DS are shown schematically. The first communication device 2E being inside the first fixed communication cell 122 and outside the second fixed communication cell 112, substantially communicates with the second fixed base station 111 via the dynamic communication station DS. The second communication device 2F being inside the overlapping area of the first fixed communication cell 122 and the second fixed communication cell 112, substantially communicates with the second fixed base station 111 via the dynamic communication station DS. It should be noted that the dynamic communication station DS as an IAB node may expand a moving communication cell such as the satellite communication cell 132, with a moving base station such as the communication satellite 131 as a parent base station.

The dynamic communication station DS when realized as a moving communication station (such as an IAB node) is attached to a movable object, except when it can move (or fly) autonomously like the communications satellite 131. A movable object is any movable thing or person and includes, for example, automobiles, trains, motorcycles, bicycles, airplanes, drones, ships, and any other vehicles. Besides, the moving dynamic communication station DS may be a communication device 2 used by a moving person, for example, a communication device 2 equipped with a tethering function and/or personal hotspot function. Since such a communication device 2 (dynamic communication station DS) usually functions as a wireless LAN access point, the RAT (e.g., 5G NR) used by the base station to be expanded (e.g., the second fixed base station 111) and the RAT used by the expanding dynamic communication station DS may be different.

Figure 3:
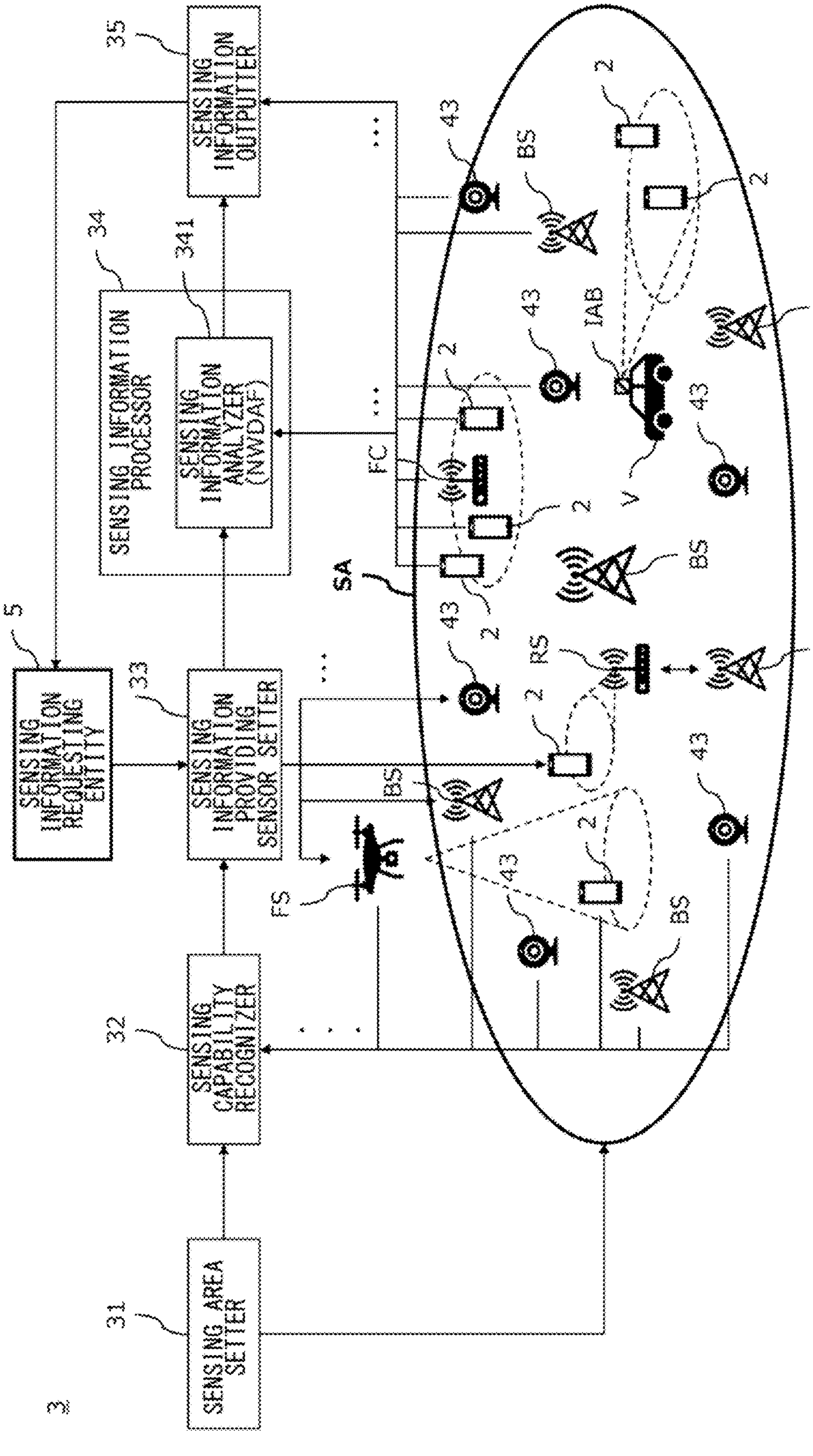
FIG. 3 is a functional block diagram of the communication control apparatus.

FIG. 3 is a functional block diagram of the communication control apparatus 3 according to the present embodiment. The communication control apparatus 3 includes a sensing area setter 31, a sensing capability recognizer 32, a sensing information providing sensor setter 33, a sensing information processor 34, and a sensing information outputter 35. Some of these functional blocks can be omitted as long as the communication control apparatus 3 realizes at least some of the operations and/or effects described below. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in the present embodiment, some or all of functional blocks of the communication control apparatus 3 may be realized in a centralized or distributed manner by computer and/or processor provided in various communication stations that can communicate in a radio access network (RAN) (as described below, a communication device 2, a terrestrial base station BS, an extremely small base station (a femtocell) FC, a flying communication station FS, a relay station RS, an IAB node IAB, a gateway 133, and the like are included), movable objects V on which communication stations are mounted, sensor units 43, or the core network CN (not shown in FIG. 3). In the following examples, unless otherwise noted, it is assumed that most functional blocks of the communication control apparatus 3 are realized in the core network CN.

The sensing area setter 31 sets a sensing area SA. A sensing area SA is a freely configurable area in the core network CN. Sensing information of various sensors provided in a sensing area SA, can be requested by a sensing information requesting entity 5, which is any individual or legal entity. Single sensing area SA includes one or more communication stations and/or one or more sensors. In new mobile communication networks such as 5G, where extremely small femtocells FC and the like are increasingly utilized, it is assumed that single sensing area SA includes a large number of communication stations and/or a large number of sensors, as schematically illustrated in the figure. Each sensing area SA is preferably assigned identification information or ID to uniquely identify it, and managed in the core network CN. In the following, such identification information of a sensing area SA is referred to as a sensing area ID.

In a sensing area SA, various communication stations and/or various sensors are provided, being capable of communicating in the RAN and/or the core network CN of the mobile communication network. A communication station may be any device equipped with communication capability that can directly or indirectly access the RAN. Examples of communication station include: a terrestrial base station BS that is fixedly installed on the ground and provides relatively large communication cell (e.g., a picocell, a microcell, a macrocell); an extremely small base station FC that provides a femtocell; a flying communication station FS implemented on flying satellite, aircraft, drone, and the like (it may function as a base station like the communication satellite 131, or it may be something like a relay station or an IAB node accompanying another base station); a relay station RS that communicates with an existing base station BS to expand an existing communication cell; the aforementioned IAB node IAB; and a sensor unit 43 described below.

Besides, a communication device 2 such as a smartphone that can communicate directly or indirectly with such communication stations is also an example of the communication station in the present disclosure. The communication device 2 may cooperate with other communication stations such as the terrestrial base station BS, the extremely small base station FC, the flying communication station FS, the relay station RS, the IAB node IAB, the sensor unit 43, in collecting sensing information and providing it through a mobile communication network. In such a case, any combination of a plurality of communication stations, such as the communication device 2 and other communication stations that cooperate in collecting and/or providing sensing information, may virtually function as single communication station.

Besides, the sensor in the present embodiment may be any device that can provide its sensing information through the mobile communication network. If the various communication stations described above have sensor functions, such communication stations also function as sensors. Alternatively, it can be said that a sensor capable of providing its sensing information through the RAN functions as a communication station.

A sensor is any type of device that performs measurement at any location in the sensing area SA. The sensing target of each sensor is also freely selected. For example, the sensor may be an image sensor such as a camera, or a voice sensor such as a microphone. Besides, the sensors may be temperature sensors, humidity sensors, electrical sensors, magnetic sensors, optical sensors, mechanical sensors, acoustic sensors, chemical sensors, biological sensors, or other sensors that measure physical, chemical, or biological parameters that directly or indirectly indicate various states of the sensing target. Furthermore, the sensors may capture communication sensing information such as communication quality, traffic volume, and communication type in the mobile communication network. Such various sensors are distributed on the mobile communication network in various manners or forms (i.e., provided in various communication stations).

The communication device 2 such as a smartphone as the sensor and the communication station may be equipped with sensor functions such as image sensors (cameras), voice sensors (microphones), temperature sensors, acceleration sensors (inertial sensors), position sensors (the GPS and the like), and biometric sensors (to measure heart rate or blood pressure). Besides, communication devices 2 such as smartphones are standardly equipped with various communication measurement (communication sensor) functions for mobile communication with mobile communication networks. Specifically, a communication device 2 functioning as a communication sensor measures the communication quality and the like at its own position and provides it to the base station BS and the like in the form of channel state information (CSI) and the like.

Besides, one or more sensors of any type can be provided in communication stations such as the terrestrial base station BS, the extremely small base station FC, the flying communication station FS, the relay station RS, and the IAB node IAB, which constitute a mobile communication network (especially RAN) and can communicate with the communication device 2. For example, such communication stations function as communication sensors that can measure the quality of the communication cells they provide to the communication devices 2, the interference with other communication cells, and the like, based on communication quality information and the like such as CSI provided from typically a large number of connected communication devices 2. Besides, the communication-device functional unit 41 (IAB-MT) in the IAB node IAB as the dynamic communication station DS illustrated with respect to FIG. 2, can be equipped with standard communication measurement (communication sensor) functions similar to general communication devices 2 such as smartphones.

At least some of the sensors may be provided as the sensor units 43 that can communicate directly or indirectly with communication stations (the terrestrial base station BS, the extremely small base station FC, the flying communication station FS, the relay station RS, the IAB node IAB, and the like) that constitute the mobile communication network (especially RAN). It should be noted that the sensor units 43 (or various communication stations (the IAB node IAB in the example shown in the figure)) may be provided in movable objects such as vehicles V or any other objects equipped with communication functions. Such sensor units 43 do not need to be equipped with advanced communication functions like general-purpose communication devices 2 such as smartphones, but may be like an IoT devices with minimal communication functions that can share sensing results with the RAN and/or the core network CN. Besides, the sensor unit 43 may utilize short-range wireless communication technologies such as Bluetooth (registered trademark) to provide sensing result to nearby other communication stations (the communication device 2, the terrestrial base station BS, the extremely small base station FC, the flying communication station FS, the relay station RS, the IAB node IAB, and the like) and/or nearby other sensor units 43 and the like, and from there relaying or providing it to the RAN and/or the core network CN as necessary.

The wide variety of sensors described above constitute a sensor network by being interconnected or coupled via a mobile communication network (especially RAN). The function of the core network CN or the communication control apparatus 3 (in particular, the sensing information providing sensor setter 33 and the sensing information processor 34 described below), which collects and analyzes sensing information of various sensors from such a sensor network, may be realized by at least a portion of the AI (Artificial Intelligence)/ML (Machine Learning) functions responsible for collecting and analyzing data on a mobile communication network such as the NWDAF (Network Data Analytics Function). Such AI/ML functions and other data processing functions are typically realized in the core network CN, but may be realized at least in part by an edge server provided closer to a communication device 2 (on the RAN side) than the core network CN. The technology for distributing and expediting processes by utilizing such an edge server is also called the multi-access edge computing (MEC). Besides, the data processing functions available for the sensing information providing sensor setter 33, the sensing information processor 34, and the like may be realized at least in part in the user plane function (UPF) in the core network CN.

The sensing capability recognizer 32 causes the mobile communication network to recognize the sensing capabilities of a plurality (typically a large number) of sensors that can communicate in the mobile communication network. The sensing capability recognizer 32 may cause each of the sensors (or each communication station where each sensor is provided) to notify the mobile communication network (especially the core network CN) of information concerning the sensing capability set in each of the sensors. Alternatively, the sensing capability recognizer 32 provided in the core network CN, for example, may recognize the sensing capability of each of the sensors, by setting the sensing capability in each of the sensor itself.

FIG. 4 is a table showing examples of sensing capabilities of a large number of sensors that the mobile communication network (especially the core network CN) recognizes by the sensing capability recognizer 32. Such a table is preferably created in the core network CN and stored or managed in a manner that can be referenced or utilized at any time. Besides, it is preferable for such a table to be updated from time to time, when a new communication station and/or a new sensor is added to each sensing area SA, or when a change is made to an existing communication station and/or an existing sensor.

The information stored in the table in the example shown in the figure includes: sensing area ID; cell ID; cell type; cell location; sensing item (Sensed Information); sensing accuracy; providing manner of sensing information (Provision Manner of Sensed Information); use case; and the like.

As mentioned above, the sensing area ID is the identification information of the sensing area SA. If there is no ID that can be utilized as the sensing area ID in existing wireless communication standards such as 5G, it is preferable to newly create such an ID.

The Cell ID is the identification information of a communication station and/or a sensor included in the sensing area SA that can provide various sensing information concerning the sensing area SA. The "cell" in the present figure mainly means an area where sensors (including sensor functions of communication stations) can acquire sensing information, in other words, an area to be sensed by sensors. It can be said that any group of such "cells" is the sensing area SA. It should be noted that various IDs assigned to identify communication stations and/or sensors with mobile communication functions on a mobile communication network may be utilized as the cell IDs in the present figure. For example, since the base station BS or the extremely small base station FC and the like that provides a communication cell is assigned an ID to identify such a communication cell (generally referred to as a cell ID), this may be utilized as the (sensing) cell ID in the present figure.

The cell type is the type of a communication station and/or a sensor that constitute the sensing area SA. As mentioned above, examples of the cell type include the base station BS (e.g., a non-terrestrial base station such as the communication satellite 131 (Satellite BS) or a terrestrial base station that provides a macrocell and the like (Macrocell BS)), the extremely small base station FC (Femtocell FC), the flying communication station FS (Aircraft FS), the relay station RS (Relay Station RS), the IAB Node IAB (IAB Node IAB), the sensor unit (Sensor Unit) 43, and the communication device (UE) 2. It should be noted that, while in the illustrated example each cell type has just one entry for simplicity, actually a plurality of different communication stations and/or sensors of the same cell type (to which different cell IDs are assigned) may be included in one sensing area SA.

The cell location is the location of a communication station and/or a sensor that constitute the sensing area SA. In the example shown in the figure, the cell location of the non-terrestrial base station BS (Satellite BS) with the cell ID "Cell #1" is low earth orbit (Low Earth Orbit), the cell location of the terrestrial base station BS (Macrocell BS) with the cell ID "Cell #2" is outdoor (Outdoor) or along a street (Street), the cell location of the extremely small base station FC (Femtocell FC) with the cell ID "Cell #3" is outdoor (Outdoor) or indoor (Indoor), the cell location of the flying communication station FS (Aircraft FS) with the cell ID "Cell #4" is troposphere (Troposphere), the cell location of the relay station RS (Relay Station RS) with the cell ID "Cell #5" is outdoor (Outdoor), in a tunnel (Tunnel), or indoor (Indoor), the cell location of the IAB node IAB (IAB Node IAB) with the cell ID "Cell #6" is outdoor (Outdoor) or indoor (Indoor), the cell location of the sensor unit (Sensor Unit) 43 with the cell ID "Cell #7" is outdoor (Outdoor), indoor (Indoor), or inside a building (Inside Building), and the cell location of the communication device (UE) 2 with the cell ID "Cell #8" is outdoor (Outdoor) or indoor (Indoor).

Cell locations of communication stations and/or sensors fixedly installed on the ground indicate the installation locations of such communication stations and/or sensors. Besides, cell locations of moving communication stations and/or sensors may be measured in real time and updated from time to time by positioning sensors such as GPS provided in such communication stations and/or sensors.

The sensing item (Sensed Information) is the item or the information that can be sensed by a communication station and/or a sensor that constitute the sensing area SA. The items that can be sensed by various sensors have been described above. In the example shown in the figure, the sensing items of the non-terrestrial base station BS (Satellite BS), the terrestrial base station BS (Macrocell BS), and the flying communication station FS (Aircraft FS) include the communication quality (Com. quality), the sensing items of the extremely small base station FC (Femtocell FC), the relay station RS (Relay Station RS), and the IAB node IAB (IAB Node IAB) include the number of connected users (Connected users), and the sensing items of the sensor unit (Sensor Unit) 43 and the communication device (UE) 2 include various information (Various information).

The sensing accuracy is the accuracy or the confidence level of the sensing by a sensor that constitutes the sensing area SA. The sensing accuracy can be expressed by any indicator. In the example shown in the figure, the sensing accuracy is expressed as a percentage, where "100%" is the sensing accuracy when the sensor can perfectly sense the sensing target without any error.

As shown schematically in the table in FIG. 5, in case the sensor senses the physical position or velocity of the sensing target, the sensing accuracy may be expressed by the sensible resolution (e.g., mm-level, cm-level, m-level for position). The sensing accuracy may include elements related to the time required for the sensing itself and/or the transmission of the sensing information (Max sensing service latency: the shorter, the better the accuracy), the update frequency of sensing information (Refreshing rate: the higher, the better the accuracy), and the sensing error (Missed detection/False (Missed detection/false alarm: the fewer, the better the accuracy). It should be noted that, in FIG. 5, the scenario corresponds to the use case (crowd detection is illustrated), and the sensing service area corresponds to the sensing area SA.

The sensing accuracy recorded in the table of sensing capabilities in FIG. 4 may be the highest sensing accuracy that each sensor can provide. In such case, as described below, each sensor and/or the sensing information processor 34 or the sensing information outputter 35 may adaptively change the accuracy or detail level of the sensing information provided to the sensing information requesting entity 5, within the applicable range of the sensing accuracy of each sensor, in accordance with the use case or the sensing information requesting entity 5 of the sensing information.

The providing manner of sensing information (Provision Manner of Sensed Information) is the manner of the sensing information provided by each sensor and/or the sensing information processor 34 or the sensing information outputter 35 described below to the sensing information requesting entity 5. In FIG. 4, the anonymity of the sensing information (Anonymous/Onymous) is illustrated as the providing manner. "Anonymity" mainly means property with which the location, the user, the capability, or other various individual information of the communication station and/or the sensor that provides the sensing information, is not identified from the sensing information provided to the sensing information requesting entity 5. It should be noted that, even if a sensor provides sensing information without anonymity (i.e., the sensor can be identified from it) to the core network CN, for example, by the sensing information processor 34 described below that performs anonymization process, the anonymized sensing information may be provided to the sensing information requesting entity 5.

The use case is the use case in which the sensing information of a sensor that constitutes the sensing area SA can be used. Examples of the use case include a public use case (Public) such as an emergency report to an emergency agency (Emergency Agency), a commercial use case (Commercial) by a private service provider (Service Provider), and an OAM (Operations/Administration/Maintenance) use case by an operator of a mobile communication network (Operator). Concrete use cases can be freely set, but examples include an emergency report to an emergency agency, a monitoring of congestion state, a detection of a suspicious person. Besides, use cases may be set based on time factors. For example, a use case may be set for monitoring congestion state during the daytime, detecting a suspicious person at night, and the like.

The use case may be defined in accordance with the sensing information requesting entity 5, which is the beneficiary of the sensing information (Beneficiary of Info.). For example, the sensing data of the cell ID "Cell #1" recording the emergency agency (Emergency Agency) as the sensing information requesting entity 5, can be used for the public use case (Public) such as an emergency report. Besides, the sensing data of the cell ID "Cell #2" recording the service provider (Service Provider) as the sensing information requesting entity 5, or the sensing data of the cell ID "Cell #7" recording the maintenance or security service of a building (Maintenance/Security) as the use case, can be used for the commercial use cases (Commercial) concerning providing various services by service providers. Furthermore, the sensing data of the cell ID "Cell #5" recording the operator (Operator) as the sensing information requesting entity 5, can be used for the OAM use case by such operator.

The use case may include a private use case (Private) with an individual (Individual) as the beneficiary or the sensing information requesting entity 5 of the sensing information. However, from the perspective of privacy protection or security and the like of the sensing information provider, it is preferable that the sensing information provided to the individual (the sensing information requesting entity 5) in such a case be highly anonymized by the sensor itself and/or the sensing information processor 34 described below.

Besides, in case an individual or private service provider is set as the beneficiary or the sensing information requesting entity 5 of the sensing information, the sensing information processor 34 or the sensing information outputter 35 described below may adaptively change the content or the detail level of the sensing information provided, in accordance with the status, attribute, and the like of each beneficiary. For example, sensing information with a high detail level may be provided to an individual or a private service provider that is given a high credit score based on the status, the attribute, and the like, and sensing information with a low detail level may be provided to an individual or a private service provider that is given a low credit score based on the status, the attribute, and the like. Besides, it is also conceivable that the mobile communication network operator itself could be the servicing entity that provides highly anonymous sensing information collected and/or analyzed in each sensing area SA to a third party (the sensing information requesting entity 5). In such a case, the sensing information processor 34 or the sensing information outputter 35 described below may adaptively change the content or the detail level of the sensing information provided to each service subscriber (the sensing information requesting entity 5), in accordance with the charged amount (or paid fee), the subscription plan, and the like for such sensing information providing service.

As shown in FIG. 4 above, the sensing area setter 31 and the sensing capability recognizer 32 manage, in the mobile communication network (especially the core network CN), the sensing capabilities of a large number of sensors (and/or communication stations) whose sensing ranges are included in the sensing area SA which can be freely set mainly on the ground, as a sensing capability group or a sensor group in the sensing area SA.

In FIG. 3, the sensing information providing sensor setter 33 sets a sensor, among a large number of sensors (and/or communication stations) whose sensing ranges are included in the sensing area SA, to provide the sensing information through a mobile communication network in response to a request for sensing information concerning the sensing area SA set by the sensing area setter 31. In other words, the sensing information providing sensor setter 33 sets one or more sensors in the sensing area SA to be actually used, in response to a request for sensing information in the sensing area SA from the sensing information requesting entity 5. Therefore, sensing information of all sensors in the sensing area SA is not always provided to the sensing information requesting entity 5 in response to a request for sensing information from the sensing information requesting entity 5, but only sensing information of typically some (not all) of the sensors set or selected by the sensing information providing sensor setter 33 is provided to the sensing information requesting entity 5 in response to such request.

FIG. 6 is a table showing examples of setting information by the sensing information providing sensor setter 33. Such a table is preferably created in the core network CN and stored or managed in a manner that can be referenced or utilized at any time. The information stored in the table in the example shown in the figure includes: sensing area ID; use case; beneficiary of sensing information (Beneficiary of Info.); used sensor (Sensor to be used); provided information (Information to be provided); required anonymity of sensitive information (Anonymizing sensitive information); detail level; and the like.

The sensing area ID is similar to that in FIG. 4. With such a sensing area ID, the sensing information requesting entity 5 specifies the sensing area SA to request for the sensing information. It should be noted that, if the sensing information requesting entity 5 does not specify a concrete sensing area SA, it may be determined that the sensing area SA in which the sensing information requesting entity 5 is located is specified. The use case and the beneficiary of sensing information (Beneficiary of Info.) are similar to those in FIG. 4. The use case may be estimated by the core network CN recognizing the beneficiary (i.e., the sensing information requesting entity 5) (e.g., if the sensing information requesting entity 5 is an emergency agency, the use case can be estimated as an emergency report), or may be indicated to the core network CN when the beneficiary requests sensing information. The information concerning the use case and/or the beneficiary constitutes the main portion of the request for sensing information concerning the sensing area SA by the sensing information requesting entity 5.

The used sensor (Sensor to be used) is a sensor to be actually used to provide sensing information, in response to a request for sensing information by the sensing information requesting entity 5 as determined by the use case and/or the beneficiary. Such sensors are specified by the cell ID and the like shown in FIG. 4. It should be noted that, in FIG. 4, a single cell specified by a single cell ID may include a plurality of sensors. In such a case, any one or more sensors included in the specific one cell may be individually specified by the "used sensor (Sensor to be used)" in FIG. 6. In the illustrated example, in the emergency report (Emergency Report) use case with the emergency agency (Emergency Agency) as the beneficiary, and in the OAM use case with the operator (Operator) as the beneficiary, almost all sensors in the sensing area SA with the sensing area ID "AAA" will be used.

Besides, in the use case of information service (Information Service) with the Commercial Service Provider or the Private Individual as the beneficiary, some sensors individually specified in the service agreement (Service Agreement) made between the information service provider (e.g., the operator) and each beneficiary will be used.

As shown schematically in the example of the figure, service providers (business entities that provide various services by utilizing the sensing information) as the beneficiaries of sensing information include, for example, a premium user (Premium User) paying relatively high service fee for the sensing information, and a standard user (Standard User) paying relatively low service fee for the sensing information. In such a case, a relatively large number of sensors may be used for the sensing information providing service for the premium user, and a relatively small number of sensors may be used for the sensing information providing service for the standard user.

Similarly, individuals as the beneficiaries of sensing information include, for example, a paying user (Paying User) paying relatively high service fee for the sensing information, and a non-paying user (Non-paying User) not paying any service fee for the sensing information. In such a case, a relatively large number of sensors may be used for the sensing information providing service for the paying user, and a relatively small number of sensors may be used for the sensing information providing service for the non-paying user.

As described above, the sensing information providing sensor setter 33 may set a sensor to provide the sensing information, in accordance with the entity requesting for the sensing information (the sensing information requesting entity 5). Besides, the sensing information providing sensor setter 33 may set a sensor to provide the sensing information, in accordance with the fee concerning the request for sensing information (the sensing information providing service). Furthermore, the sensing information providing sensor setter 33 may set a sensor to provide the sensing information in response to a request from the sensing information requesting entity 5, based on the type (the cell type in FIG. 4) or the location (the cell location in FIG. 4) of a communication station and/or a sensor that constitute the sensing area SA. In such a way, the sensing information providing sensor setter 33 preferably sets a sensor to provide the sensing information in response to a request from the sensing information requesting entity 5, based on the sensing capability of each sensor as shown in FIG. 4, as recognized by the mobile communication network through the sensing capability recognizer 32.

The provided information (Information to be provided) is the sensing information actually provided to the sensing information requesting entity 5 from the used sensor (Sensor to be used). Such sensing information is specified by the sensing item (Sensed Information) shown in FIG. 4. In the example shown in the figure, in the use case of the emergency report (Emergency Report) with the emergency agency (Emergency Agency) as the beneficiary, the sensing information acquired from each sensor used that may indicate the occurrence of an emergency, may be selected by the sensing information analyzer 341 and the like described below, and provided to the emergency agency as the sensing information requesting entity 5. Besides, in the OAM use case with the operator (Operator) as the beneficiary, the sensing information acquired from each sensor used that is useful for the OAM such as communication quality, may be selected by the sensing information analyzer 341 and the like described below, and provided to the operator as the sensing information requesting entity 5.

Furthermore, in the use case of information service (Information Service) with the Commercial Service Provider or the Private Individual as the beneficiary, as in the above case of the used sensor (Sensor to be used), some sensing information individually specified in the service agreement (Service Agreement) made between the information service provider (e.g., the operator) and each beneficiary will be provided to the sensing information requesting entity 5. For example, a relatively large amount of sensing information may be provided to the premium user or the paying user, and a relatively small amount of sensing information may be provided to the standard user or the non-paying user.

The required anonymity of sensitive information (Anonymizing sensitive information) sets the necessity or the degree of anonymization of sensitive information that may be included in the provided information (Information to be provided), for example, the sensing information without anonymity (i.e., the sensor or the user can be identified from it). Such necessity of anonymization is set within the framework of the providing manner of sensing information (Provision Manner of Sensed Information) shown in FIG. 4. For example, even in case the sensing information with the providing manner from the sensor being "without anonymity" (Onymous) in FIG. 4, if the "anonymization necessary" is set in FIG. 6, the sensing information processor 34 described below will perform the anonymization process. Besides, in case the sensing information with the providing manner from the sensor being "with anonymity" (Anonymous) in FIG. 4, any further specific anonymization process may not be performed even if the "anonymization necessary" is set in FIG. 6. In such a way, the sensing information providing sensor setter 33 sets the providing manner of sensing information from the sensor (e.g., the necessity or the degree of anonymization), in accordance with a request (e.g., the use case) from the sensing information requiring entity 5.

In the example shown in the figure, in the emergency report (Emergency Report) use case with the emergency agency (Emergency Agency) as the beneficiary, anonymization is not necessarily required because of its public nature or its urgency. In the OAM use case with the operator (Operator) as the beneficiary, anonymization is not necessarily required as long as sensitive information is handled appropriately in the mobile communication network (especially the core network CN).

In the use case of information service (Information Service) with the Commercial Service Provider or the Private Individual as the beneficiary, anonymization will be performed in accordance with the conditions individually specified in the service agreement (Service Agreement) made between the information service provider (e.g., the operator) and each beneficiary. Typically, the level of anonymization of sensing information to be provided to the premium user for the commercial use case may be set relatively low (but higher than the emergency agency case or the operator case described above), and the level of anonymization of sensing information to be provided to the non-paying user for the private use case may be set relatively high. In either case, the assumption is that sensitive information will be handled appropriately under the service agreement.

The detail level sets the level of detail or accuracy when the provided information (Information to be provided) is actually provided to the sensing information requesting entity 5. Such detail level is set within the framework of the sensing accuracy (Sensing Accuracy) shown in FIG. 4. Specifically, the sensing information with the sensing accuracy of "80%" in FIG. 4 can be provided as is to the sensing information requesting entity 5, in use cases with the detail level being "80%" or higher in FIG. 6. However, in use cases with the detail level being less than "80%" in FIG. 6, the sensing information processor 34 and the like described below can reduce the detail level to match the specified detail level and provide it to the sensing information requesting entity 5. For example, the "mm-level" sensing accuracy of the sensing information may be reduced to the "cm-level" detail level in accordance with the specified detail level, and such sensing information may be provided to the sensing information requesting entity 5.

In the example shown in the figure, in the use case of the emergency report (Emergency Report) with the emergency agency (Emergency Agency) as the beneficiary, and in the OAM use case with the operator (Operator) as the beneficiary, the process of reducing the detail level or the accuracy is not performed in principle (the sensing information is provided to the sensing information requesting entity 5 with the sensing accuracy unchanged from FIG. 4).

In the use case of information service (Information Service) with the Commercial Service Provider or the Private Individual as the beneficiary, the process of reducing the detail level or the accuracy will be performed in accordance with the conditions individually specified in the service agreement (Service Agreement) made between the information service provider (e.g., the operator) and each beneficiary. Typically, the detail level of sensing information to be provided to the premium user for the commercial use case may be set relatively high, and the detail level of sensing information to be provided to the non-paying user for the private use case may be set relatively low.

In FIG. 3, the sensing information providing sensor setter 33 that has received the request for sensing information from the sensing information requesting entity 5 refers to the table of setting information as shown in FIG. 6. Specifically, based on the request for sensing information from the sensing information requesting entity 5, the sensing information providing sensor setter 33 recognizes the sensing area ID, the use case, the beneficiary of sensing information (Beneficiary of Info.), and the like, and correspondingly reads out various setting information such as the used sensor (Sensor to be used), the provided information (Information to be provided), the required anonymity of sensitive information (Anonymizing sensitive information), the detail level. Then, based on the various setting information read out, the sensing information providing sensor setter 33 causes the specified sensor to provide the sensing information processed in accordance with the specified anonymity or detail level. It should be noted that, the processing of the sensing information in accordance with the specified anonymity or detail level may be performed by the sensing information processor 34 described next.

The sensing information processor 34, as necessary, processes the sensing information provided through the mobile communication network from each sensor based on the table of setting information as shown in FIG. 6. For example, the sensing information processor 34 functions as the sensor identifiable information reducer that reduces proper information identifiable of the sensor in its sensing information (e.g., performs necessary anonymization on the sensing information), based on the providing manner (e.g., the required anonymity of sensitive information (Anonymizing sensitive information) in FIG. 6) set by the sensing information providing sensor setter 33.

The sensing information processor (the sensor identifiable information reducer) 34 may be configured by the sensing information analyzer 341 that generates holistic analysis result of the sensing information of the plurality of sensors set by the sensing information providing sensor setter 33 (the setting information table in FIG. 6). For example, even if the anonymity or the detail level specified in the setting information table in FIG. 6 is not realized for the individual sensing information of each sensor that is input to the sensing information analyzer 341, the anonymity or the detail level can be appropriately adjusted when the sensing information analyzer 341 holistically analyzes such individual sensing information. Such a sensing information analyzer 341 may be realized by the NWDAF.

The NWDAF is an AI/ML function introduced in the 5GC as the core network CN of 5G. The NWDAF is responsible for collecting and analyzing data on the network including 5G. Specifically, the NWDAF collects and accumulates activity history information or sensing information of a large number of communication stations or other objects connected to the mobile communication network, and utilizes the analysis results for traffic control on the mobile communication network, for example. It should be noted that, in other wireless communication systems, including those of later generations than 5G, functions similar to the NWDAF might be provided under different names. Such similar functions may be utilized in the present embodiment instead of or in addition to the NWDAF.

The sensing information outputter 35 outputs to the sensing information requesting entity 5, the sensing information with reduced information identifiable of the sensor by the sensing information processor (the sensor identifiable information reducer) 34, or other processed sensing information, in response to the request for sensing information from the sensing information requesting entity 5. It should be noted that, in a use case where the processing of sensing information by the sensing information processor 34 is not necessary, the sensing information outputter 35 may output the sensing information from each sensor to the sensing information requesting entity 5 as it is.

As described above, the sensing information output by the sensing information outputter 35 to the sensing information requesting entity 5 is based on the sensing capability group in a sensing area (e.g., the sensing area SA with the sensing area ID "AAA"), as shown in FIG. 4 or FIG. 6. As such, instead of handling the sensing information of each sensor individually, a large number of sensors in the sensing area SA are treated as a group, which enables flexibly providing appropriate sensing information using appropriate sensors for various use cases.

Figure 7:
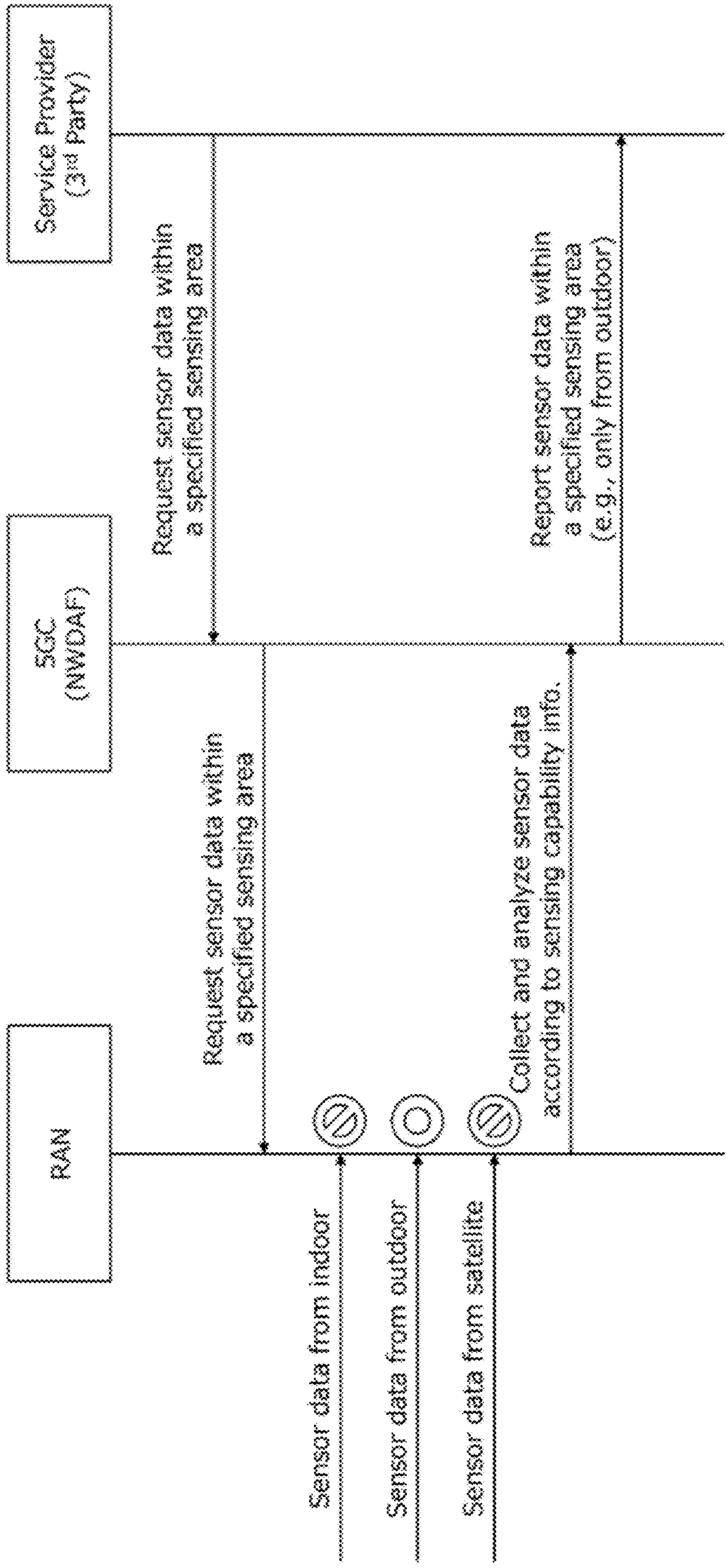
FIG. 7 schematically shows an example of providing sensing information in response to a request from a sensing information requesting entity.

FIG. 7 schematically shows an example of providing sensing information in response to a request from the sensing information requesting entity 5. The sensing information requesting entity 5 in the present example is a service provider (Service Provider) or a third party ($3^{rd}$ Party) for commercial use case (Commercial). Such service provider is entitled to request, subscribe to, or view only "outdoor" (Outdoor) sensing information in a specific sensing area SA, based on a service agreement (Service Agreement) made with the operator as the provider of the sensing information providing service. The setting information based on such a service agreement is recorded in a table as shown in FIG. 6, and managed in the core network CN (the sensing information providing sensor setter 33).

The service provider (Service Provider) shown in the figure requests against the NWDAF and the like in the 5GC, the sensing data (sensor data) in the specific sensing area SA it is subscribing to. The sensing information providing sensor setter 33 provided in the 5GC receives the request for sensing information from the service provider (the sensing information requesting entity 5). Then, the sensing information providing sensor setter 33 refers to the table of setting information as shown in FIG. 6, and recognizes that the service provider has access only to "outdoor" sensing information. Therefore, the sensing information providing sensor setter 33 causes only the sensors located "outdoors" to provide the sensing information, among the large number of sensors in the sensing area SA.

The core network CN (the sensing information processor 34) that has collected sensing data from the large number of "outdoor" sensors, processes (e.g., anonymizes) the sensing data as necessary in accordance with the table of setting information as shown in FIG. 6. Subsequently, the sensing information outputter 35 provides the "outdoor" sensing data (Report) processed as necessary by the sensing information processor 34 to the service provider as the sensing information requesting entity 5.

According to the present embodiment, the utilization efficiency of the sensor group is improved by the mobile communication network (e.g., the sensing capability recognizer 32 provided in the core network CN) that has recognized the sensing capabilities of a plurality of sensors and/or communication stations capable of mobile communication.

Besides, according to the present embodiment, among a plurality of sensors and/or communication stations capable of mobile communication, the sensor and/or the communication station to actually provide the sensing information is flexibly set in accordance with the request (e.g., the sensing information requesting entity 5) for sensing information concerning the sensing area SA. Based on such a setting (e.g., the table in FIG. 6), the necessary sensing information is quickly provided from the appropriate sensor in accordance with the actual request from the sensing information requesting entity 5, thereby improving the utilization efficiency of the sensor group in the mobile communication network.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMS, RAMs and various integrated circuits can be used. As software resources, for example, programs such as operating systems and applications can be used.

The present disclosure may be expressed as the following items.

1. A communication control apparatus comprising at least one processor that performs, by a sensing capability recognizer, causing a mobile communication network to recognize sensing capabilities of a plurality of sensors that can communicate in the mobile communication network.
2. The communication control apparatus according to item 1, wherein the at least one processor performs, by a sensing area setter, setting a sensing area, and managing, in the mobile communication network, the sensing capabilities of the plurality of sensors whose sensing ranges are included in the sensing area, as a sensing capability group in the sensing area.
3. The communication control apparatus according to item 2, wherein the at least one processor performs, by a sensing information outputter, outputting sensing information based on the sensing capability group in the sensing area.
4. The communication control apparatus according to any of items 1 to 3, wherein at least one of the plurality of sensors is provided in a communication station capable of communicating in the mobile communication network, and the sensing capability includes a type of the communication station.

5. The communication control apparatus according to item 4, wherein the communication station includes at least one of: a base station constituting the mobile communication network; and a communication station capable of communicating with the base station.

6. The communication control apparatus according to any of items 1 to 5, wherein the sensing capability includes the location of each of the sensors.

7. The communication control apparatus according to any of items 1 to 6, wherein the sensing capability includes the use case in which the sensing information of each of the sensors can be used.

8. The communication control apparatus according to any of items 1 to 7, wherein the sensing capability includes the sensing item of each of the sensors.

9. The communication control apparatus according to any of items 1 to 8, wherein the sensing capability includes the sensing accuracy of each of the sensors.

10. The communication control apparatus according to any of items 1 to 9, wherein the sensing capability includes the providing manner of the sensing information of each of the sensors.

11. The communication control apparatus according to any of items 1 to 10, wherein the sensing capability recognizer causes each of the sensors to notify the mobile communication network of information concerning the sensing capability set in each of the sensors.

12. The communication control apparatus according to any of items 1 to 11, wherein the sensing capability recognizer causes the mobile communication network to set the sensing capability in each of the sensors.

13. A communication control method performing, causing a mobile communication network to recognize sensing capabilities of a plurality of sensors that can communicate in the mobile communication network.

14. A computer-readable medium storing a communication control program causing a computer to perform, causing a mobile communication network to recognize sensing capabilities of a plurality of sensors that can communicate in the mobile communication network.

15. A communication control apparatus comprising at least one processor that performs, by a sensing information providing sensor setter, setting a sensor, among a plurality of sensors whose sensing ranges are included in a sensing area, to provide the sensing information through a mobile communication network in response to a request for sensing information concerning the sensing area.

16. The communication control apparatus according to item 15, wherein the sensing information providing sensor setter sets the providing manner of the sensing information from the sensor in response to the request.

17. The communication control apparatus according to item 16, wherein the at least one processor:

by a sensor identifiable information reducer, reducing information identifiable of the sensor in its sensing information, based on the providing manner set by the sensing information providing sensor setter, in response to the request; and by a sensing information outputter, outputting the sensing information with reduced information identifiable of the sensor by the sensor identifiable information reducer, in response to the request.

18. The communication control apparatus according to item 17, wherein the sensor identifiable information reducer is configured by a sensing information analyzer that generates a holistic analysis result of sensing information of the plurality of sensors set by the sensing information providing sensor setter, in response to the request.

19. The communication control apparatus according to item 18, wherein the sensing information analyzer is configured by the NWDAF (Network Data Analytics Function).

20. The communication control apparatus according to any of items 15 to 19, wherein the sensing information providing sensor setter sets a sensor to provide the sensing information in accordance with the entity of the request.

21. The communication control apparatus according to any of items 15 to 20, wherein the sensing information providing sensor setter sets a sensor to provide the sensing information in accordance with the fee concerning the request.

22. The communication control apparatus according to any of items 15 to 21, wherein at least one of the plurality of sensors is provided in a communication station that can communicate in the mobile communication network, and the sensing information providing sensor setter sets a sensor to provide the sensing information in response to the request based on the type of the communication station.

23. The communication control apparatus according to item 22, wherein the communication station includes at least one of a base station constituting the mobile communication network, and a communication station capable of communicating with the base station.

24. The communication control apparatus according to any of items 15 to 23, wherein the sensing information providing sensor setter sets a sensor to provide the sensing information in response to the request based on the location of each of the sensors.

25. The communication control apparatus according to any of items 15 to 24, wherein the at least one processor performs, by a sensing capability recognizer, causing the mobile communication network to recognize sensing capabilities of the plurality of sensors, and the sensing information providing sensor setter sets a sensor to provide the sensing information in response to the request based on the sensing capability of each of the sensors recognized by the mobile communication network.

26. The communication control apparatus according to item 25, wherein the sensing capability includes the sensing item of each of the sensors.

27. The communication control apparatus according to item 25 or 26, wherein the sensing capability includes the sensing accuracy of each of the sensors.

28. A communication control method performing, setting a sensor, among a plurality of sensors whose sensing ranges are included in a sensing area, to provide the sensing information through a mobile communication network in response to a request for sensing information concerning the sensing area.

29. A computer-readable medium storing a communication control program causing a computer to perform, setting a sensor, among a plurality of sensors whose sensing ranges are included in a sensing area, to provide the sensing information through a mobile communication network in response to a request for sensing information concerning the sensing area.

The present disclosure relates to sensor setting in accordance with request for sensor information concerning sensing area.

1 wireless communication system, 2 communication device, 3 communication control apparatus, 5 sensing information requesting entity, 11 5G wireless communication system, 12 4G wireless communication system, 13 satellite communication system, 31 sensing area setter, 32 sensing capability recognizer, 33 sensing information providing sensor setter, 34 sensing information processor, 35 sensing information outputter, 43 sensor unit, 111 5G base station, 112 5G cell, 121 4G base station, 122 4G cell, 131 communication satellite, 132 satellite communication cell, 133 gateway, 341 sensing information analyzer.

What is claimed is:

1. A communication control apparatus configured to perform:

by a sensing information providing sensor setter, setting a sensor, among a plurality of sensors whose sensing ranges are included in a sensing area, to provide sensing information through a mobile communication network in response to a request for sensing information concerning the sensing area, wherein the sensing information providing sensor setter, is configured to set a providing manner of the sensing information from the sensor in response to the request;

by a sensor identifiable information reducer, reducing information identifiable of the sensor in the sensing information, based on the providing manner set by the sensing information providing sensor setter, in response to the request; and by a sensing information outputter, outputting the sensing information with reduced information identifiable of the sensor by the sensor identifiable information reducer, in response to the request.

2. The communication control apparatus according to claim 1, wherein the sensor identifiable information reducer is configured further configured to perform, by a sensing information analyzer that generates configured to generate a holistic analysis result of sensing information of the plurality of sensors set by the sensing information providing sensor setter, configuring the sensor identifiable information reducer in response to the request.

3. The communication control apparatus according to claim 2, further configured to perform, by a NWDAF (Network Data Analytics Function), configuring the sensing information analyzer.

4. The communication control apparatus according to claim 1, further configured to perform, by the sensing information providing sensor setter, setting the sensor to provide the sensing information in accordance with an entity of the request.

5. The communication control apparatus according to claim 1, further configured to perform, by the sensing information providing sensor setter, setting the sensor to provide the sensing information in accordance with a fee concerning the request.

6. The communication control apparatus according to claim 1, wherein at least one of the plurality of sensors is provided in a communication station that can communicate in the mobile communication network, and the communication control apparatus is further configured to perform, by the sensing information providing sensor setter, setting the sensor to provide the sensing information in response to the request based on a type of the communication station.

7. The communication control apparatus according to claim 6, wherein the communication station includes at least one of a base station constituting the mobile communication network, or the communication station capable of communicating with the base station.

8. The communication control apparatus according to claim 1, further configured to perform, by the sensing information providing sensor setter, setting the sensor to provide the sensing information in response to the request based on a location of each of the sensors.

9. The communication control apparatus according to claim 1, further configured to perform:

by a sensing capability recognizer, causing the mobile communication network to recognize sensing capabilities of the plurality of sensors, and by the sensing information providing sensor setter, setting the sensor to provide the sensing information in response to the request based on the sensing capability of each of the sensors recognized by the mobile communication network.

10. The communication control apparatus according to claim 9, wherein the sensing capability includes a sensing item of each of the sensors.

11. The communication control apparatus according to claim 9, wherein the sensing capability includes a sensing accuracy of each of the sensors.

12. A communication control method, comprising:

setting a sensor, among a plurality of sensors whose sensing ranges are included in a sensing area, to provide sensing information through a mobile communication network in response to a request for sensing information concerning the sensing area, wherein a providing manner of the sensing information is set in response to the request;

reducing information identifiable of the sensor in the sensing information, based on the providing manner set, in response to the request; and outputting the sensing information with reduced information identifiable of the sensor in response to the request.

13. A non-transitory computer-readable medium storing a communication control program causing a computer to perform:

setting a sensor, among a plurality of sensors whose sensing ranges are included in a sensing area, to provide sensing information through a mobile communication network in response to a request for sensing information concerning the sensing area, wherein a providing manner of the sensing information is set in response to the request;

reducing information identifiable of the sensor in the sensing information, based on the providing manner set, in response to the request; and outputting the sensing information with reduced information identifiable of the sensor in response to the request.

* * * * *